United States Patent
Cai et al.

(10) Patent No.: US 12,136,747 B2
(45) Date of Patent: Nov. 5, 2024

(54) METHOD OF MAKING A BATTERY CELL INCLUDING CLAMPING, TAPERING, TRIMMING AND ULTRASONIC WELDING OF ELECTRODE FOILS

(71) Applicant: GM GLOBAL TECHNOLOGY OPERATIONS LLC, Detroit, MI (US)

(72) Inventors: Wayne W. Cai, Troy, MI (US); Thomas Alumoottil, Carrollton, TX (US); Jennifer T. Bracey, Holly, MI (US); Teresa J. Rinker, Royal Oak, MI (US); Cammi L. Siu, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 17/868,887

(22) Filed: Jul. 20, 2022

(65) Prior Publication Data

US 2024/0030564 A1    Jan. 25, 2024

(51) Int. Cl.
*H01M 50/536* (2021.01)
*B23K 20/10* (2006.01)
*B23K 101/36* (2006.01)

(52) U.S. Cl.
CPC .......... *H01M 50/536* (2021.01); *B23K 20/10* (2013.01); *B23K 2101/36* (2018.08)

(58) Field of Classification Search
CPC .. B23K 20/10; B23K 20/233; B23K 20/2333; B23K 2101/36; B23K 2103/10; B23K 2103/12; B23K 26/38; H01M 50/536; Y02E 60/10
See application file for complete search history.

(56) References Cited

U.S. PATENT DOCUMENTS

| | | | |
|---|---|---|---|
| 2011/0189532 A1* | 8/2011 | Cai | H01M 50/528 429/160 |
| 2020/0112015 A1* | 4/2020 | Tao | B23K 26/244 |
| 2024/0030564 A1* | 1/2024 | Cai | B23K 20/10 |

* cited by examiner

*Primary Examiner* — Minh N Trinh
(74) *Attorney, Agent, or Firm* — Quinn IP Law

(57) ABSTRACT

A method for manufacturing a battery cell having electrode foils protruding from a cell pouch includes positioning the cell pouch in a fixture such that distal end sections of the foils extend outward from the fixture. The method includes clamping the distal end sections in a curvilinear guide clamp to cause the distal end sections to taper into an electrode foil stack, and then translating the clamp a predetermined distance toward the fixture to displace the distal end sections by the predetermined distance. The method also includes trimming the distal end sections using a trim tool, positioning a sonotrode and an anvil adjacent opposite surfaces of the stack, and ultrasonically welding the stack to a conductive lead tab using the sonotrode to thereby form a welded joint within the battery cell. The sonotrode may be multi-sided with different knurl patterns for performing different welding processes.

20 Claims, 5 Drawing Sheets

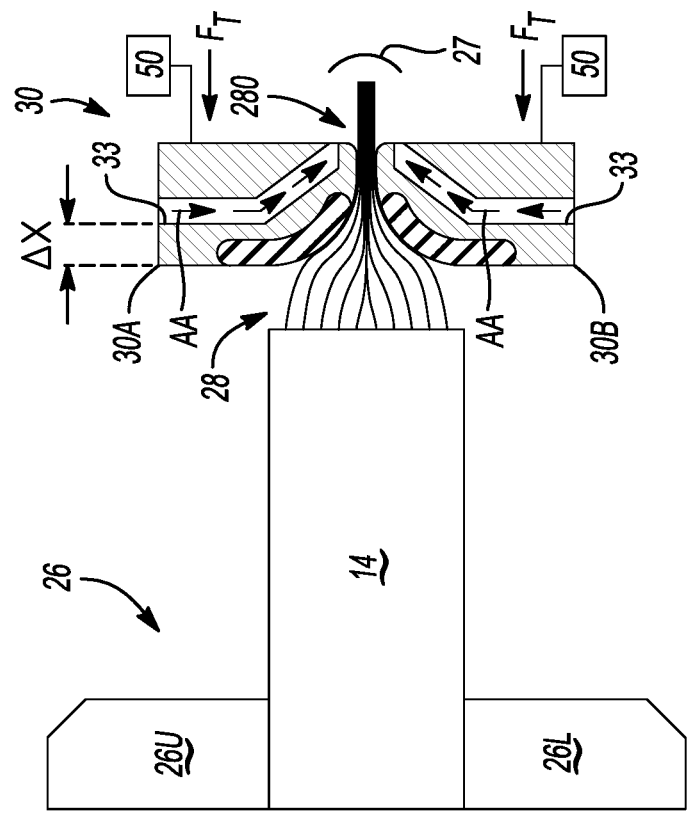
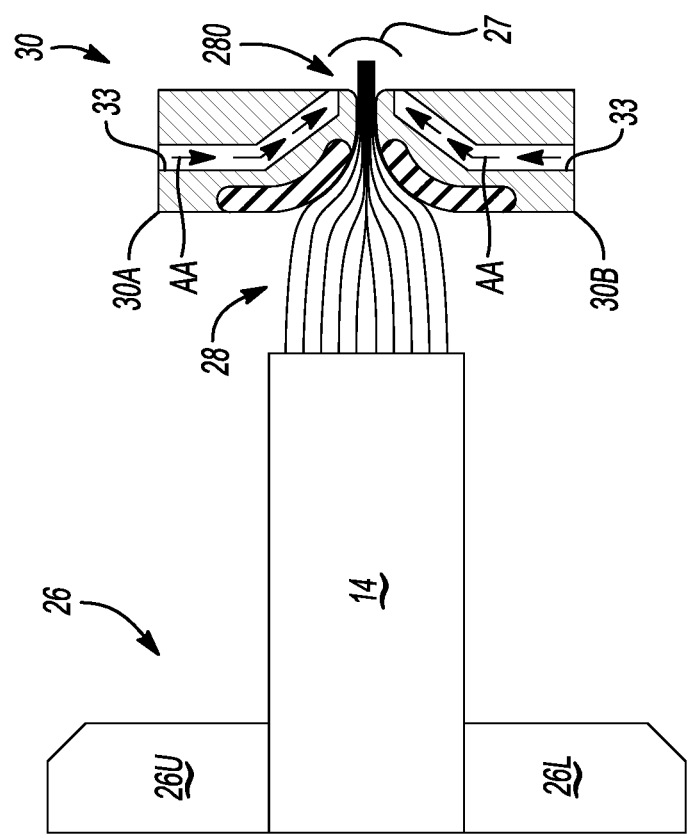

METHOD OF MAKING A BATTERY CELL INCLUDING CLAMPING, TAPERING, TRIMMING AND ULTRASONIC WELDING OF ELECTRODE FOILS

INTRODUCTION

Electrochemical battery cells and battery packs constructed from such battery cells are used as direct current (DC) power supplies in a myriad of high-power battery electric systems. An electric vehicle, for instance, includes a high-voltage propulsion battery pack having an application-suitable number of cylindrical, prismatic, or pouch-style battery cells. The battery pack, which is connected to a DC voltage bus, ultimately powers one or more electric propulsion motors and associated power electronic components during battery discharging modes. During battery charging modes, a charging current is provided to the constituent battery cells of the battery pack, e.g., from an offboard charging station or via onboard regeneration. Rechargeable lithium-ion batteries in particular operate by reversibly passing lithium ions back and forth through the separator and electrodes in such a construction. Grouped battery cells may be connected in series or parallel through use of an electrical interconnect board assembly, which in turn contains various electrical buses, cell sensing hardware, and power electronics necessary for operating the battery pack.

Propulsion battery packs suitable for use with electric vehicles and other high-power battery electric systems commonly utilize the noted lithium-ion battery chemistry, or other suitable chemistries such as nickel metal hydride, to produce the requisite electricity for energizing the propulsion motor(s) and other electrical components. A standard pouch-style lithium-ion cell is generally composed of working electrode foils and a permeable separator, which are surrounded by an electrolyte material. The various battery components are collectively enclosed within an electrically-insulated outer pouch. Respective positive and negative electrodes function as the cathode and anode of an assembled battery cell. A stack of thin electrode foils may be arranged in a cell body enclosed within the outer pouch in a typical construction. Such electrode foils in turn are internally welded within the pouch to a conductive lead tab that protrudes from pouch and is ultimately welded to a bus bar or other interconnecting member when constructing the battery pack.

SUMMARY

Disclosed herein are methods and systems for manufacturing an electrochemical battery cell for a battery pack. The battery cell in a possible embodiment has an outer pouch containing a cell body therein, with the cell body in turn enclosing and protecting thin metal electrode foils. Ends of the electrode foils protrude from an edge of the cell body. In particular, the present teachings pertain to methods and systems for forming internal welds of the various electrode foils to a conductive lead tab within such a battery cell. The contemplated internal welds are thus "internal" in the sense of being located fully within a volume of the outer pouch, i.e., as opposed to being "external welds" of the above-noted lead tab to a conductive bus bar or interconnecting member of the battery pack as appreciated in the art. The present teachings contemplate a streamlined performance of multiple, traditionally sequential processes at a single workstation. For example, implementations of the disclosed methodology combine clamping, optional pre-welding, electrode foil trimming, lead tab placement, and main welding processes in one or more embodiments, with such a single-station methodology being enabled by the hardware innovations described below.

In particular, optional hardware implementations include: (1) a one-step internal welding process that integrates main welding and electrode foil trimming processes while eliminating the pre-welding process, and (2) a two-step welding process which integrates the pre-welding and electrode foil trimming processes followed by performance of the main welding process. Also disclosed herein are hardware options for optimizing the above-summarized processes, including direct and/or indirect heating of an anvil and/or the various metals of the subject workpiece, i.e., the lead tab and/or the electrode foils, the use of "soft touch" guide clamps with optional integral air channels for gently guiding the electrode foils toward the anvil and an accompanying welding horn or sonotrode, and an actuator for displacing the electrode foils by a predetermined distance to reduce tension on the electrode foils.

An aspect of the disclosure includes a method for manufacturing a battery cell having a plurality of electrode foils protruding from a cell body. The method may include positioning the cell body in a fixture such that distal end sections of the electrode foils extend outward from the fixture, and clamping the distal end sections of the electrode foils between resilient polymer surfaces of a curvilinear guide clamp to thereby cause the distal end sections to taper into an electrode foil stack. The method may also include translating the curvilinear guide clamp a predetermined distance toward the fixture to thereby displace the distal end sections by the predetermined distance. As part of this embodiment, the method includes trimming a portion of the distal end sections using a trim tool, positioning a sonotrode and an anvil adjacent opposite surfaces of the electrode foil stack, and ultrasonically welding the electrode foil stack to a conductive lead tab using the sonotrode to thereby form a welded joint within the battery cell.

The predetermined distance in one or more implementations is less than about 1.0 millimeters (mm) and greater than about 0.10 mm.

Opposing sections of the curvilinear guide clamp may define respective air channels, in which case the method may include directing pressurized airflow through the respective air channels and onto the distal end sections.

Another aspect of the disclosure includes heating the electrode foil stack, the conductive lead tab, and/or the anvil via a heating source at a predetermined time that is prior to and/or concurrently with ultrasonically welding the electrode foil stack.

The sonotrode in some embodiments is a multi-sided sonotrode having different knurl patterns on each respective side of the multi-sided sonotrode. Positioning the sonotrode and the anvil adjacent opposite surfaces of the electrode foil stack in such a case includes rotating a multi-sided sonotrode to present a predetermined one of the different knurl patterns adjacent to the electrode foil stack.

The method in some implementations may be characterized by an absence of pre-welding of the electrode foils prior to ultrasonically welding the electrode foil stack to the conductive lead tab.

Trimming the portion of the distal end sections using the trim tool could occur concurrently or sequentially with ultrasonically welding the electrode foil stack to the conductive lead tab. Moreover, the trim tool may be optionally connected to the sonotrode. In such a construction, the method may include trimming the portion of the distal end sections using the trim tool concurrently with movement of the sonotrode toward the anvil.

Also disclosed herein is a workstation for manufacturing a battery cell having a plurality of electrode foils protruding from a cell body. The workstation includes a fixture configured for positioning the cell body in a predetermined orientation such that distal end sections of the electrode foils extend outward from the fixture, and a curvilinear guide clamp configured to clamp the distal end sections of the electrode foils therebetween and thereby cause the distal end sections to taper into an electrode foil stack. The curvilinear guide clamp includes resilient polymer surfaces. An actuator is configured to translate the curvilinear guide clamp a predetermined distance of about 0.10 mm to about 1 mm toward the fixture to thereby displace the distal end sections by the predetermined distance. As part of this construction, a trim tool is operable for trimming a portion of the distal end sections. The workstation also includes a sonotrode and an anvil positioned opposite the sonotrode on adjacent opposite surfaces of the electrode foil stack. The sonotrode is configured to ultrasonically weld the electrode foil stack to a conductive lead tab to thereby form a welded joint within the battery cell.

Another aspect of the present disclosure includes a method for manufacturing a battery pack having a plurality of battery cells. Each respective one of the battery cells has electrode foils protruding from a cell pouch. The method according to an exemplary embodiment includes positioning the cell pouch in a fixture such that distal end sections of the electrode foils extend outward from the fixture, and then clamping the distal end sections of the electrode foils between resilient polymer surfaces of a curvilinear guide clamp to thereby cause the distal end sections to taper into an electrode foil stack. The curvilinear guide clamp defines air channels therein. The method may include directing a pressurized airflow through the respective air channels and onto the distal end sections to maintain a planar alignment of the electrode foil stack, as well as translating the curvilinear guide clamp a predetermined distance toward the fixture to thereby displace the distal end sections by the predetermined distance, wherein the predetermined distance is configured to reduce tension on the electrode foils.

The method additionally includes trimming a portion of the distal end sections using a trim tool, positioning a sonotrode and an anvil adjacent opposite surfaces of the electrode foil stack, such that a double-sided knurl pattern of the sonotrode is adjacent the electrode foil stack, and ultrasonically welding the electrode foil stack to a conductive lead tab using the sonotrode to thereby form a welded joint within the battery cell. A plurality of the battery cells is then connected together to construct the battery pack.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

FIGS. 3A and 3B illustrate an optional tension relief mechanism that displaces the electrode foils by a small, predetermined distance to relieve tension on the electrode foils during the described integrated process.

Figure 1:
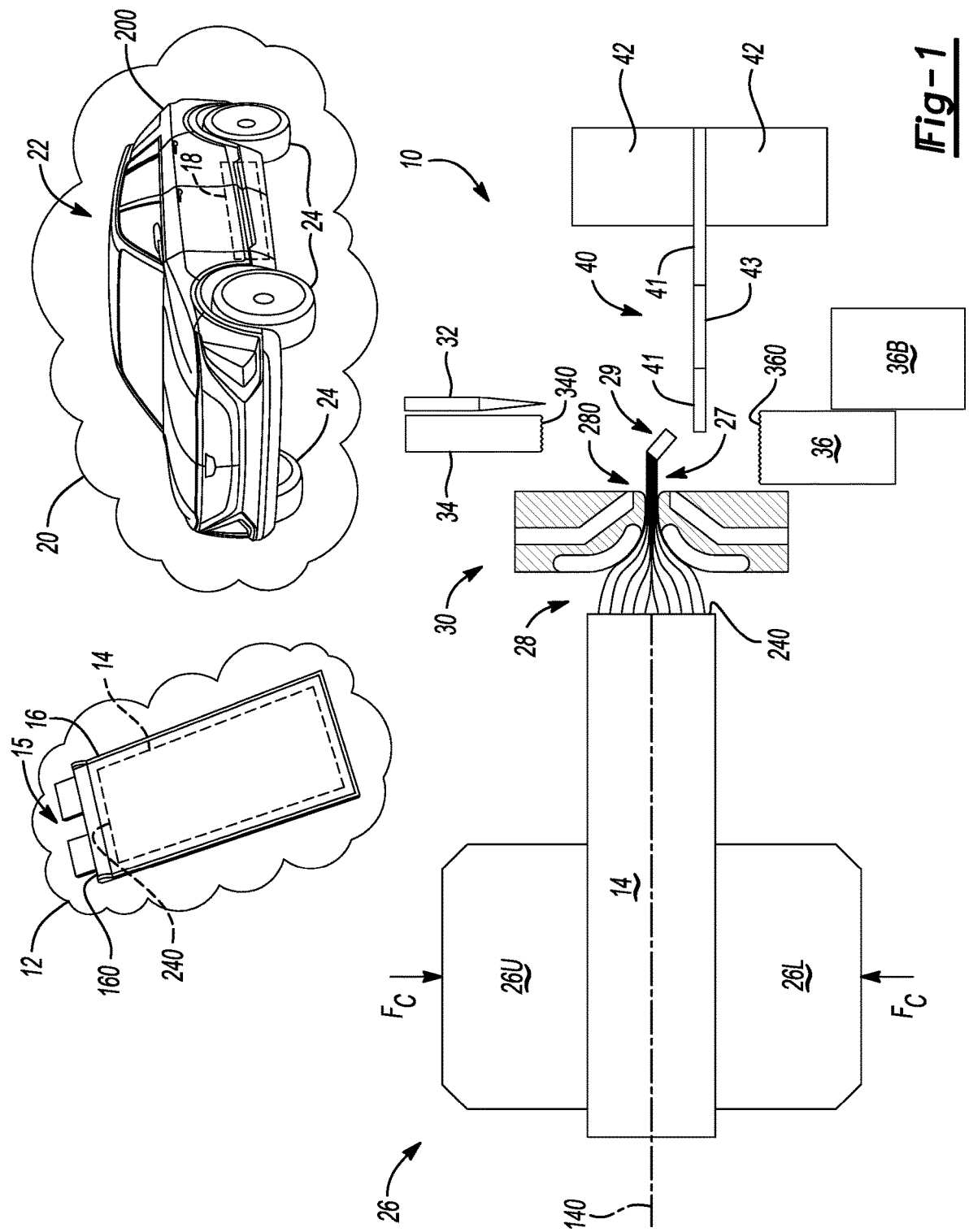
FIG. 1 is an illustration of an integrated process for forming internal welds of an electrochemical battery cell in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, wherein like reference numbers refer to like features throughout the several views, FIG. 1 depicts an integrated workstation 10 configured for performing an integrated trimming and internal welding process during manufacturing of an electrochemical battery cell 12. As noted above, the present teachings contemplate a streamlined performance of multiple traditionally separate or sequential processes at a single workstation. For example, implementations of the disclosed methodology combine clamping, optional pre-welding, electrode foil trimming, lead tab placement, and main welding processes in one or more embodiments, with such a single-station methodology being enabled by the hardware innovations described below. The solutions provided below therefore may be used to manufacture the battery cells 12 in a more efficient manner, especially in terms of manufacturing space and process time.

The battery cell 12 as contemplated herein, e.g., a lithium-ion battery cell, includes a cell body 14 and an outer casing or pouch 16 constructed of laminated foil or another suitable composition. The present teachings are not limited to batteries having lithium-ion chemistries, however, and therefore lithium-ion is just one possible construction of the battery cell 12. In the representative configuration of FIG. 1, the battery cell 12 has positive and negative external electrode tabs 15 that protrude from a perimeter edge 160 of the pouch 16. The electrode tabs 15, which may be constructed from copper, aluminum, or another application-suitable metal, allow several of the battery cells 12 to be arranged in a stack and conductively joined together in a series or parallel arrangement, e.g., using one or more bus bars or interconnecting members (not shown) when constructing a battery pack having an application-suitable output voltage.

In a representative use case, a plurality of the battery cells 12 may be joined together to form a propulsion battery pack 18 for an electrified powertrain system 20, e.g., a motor vehicle 22 having a vehicle body 200 connected to one or more road wheels 24. The motor vehicle 22 may be optionally embodied as a battery electric vehicle as shown, or as a hybrid electric vehicle. Alternatively, the electrified powertrain system 20 may be used as part of another mobile system such as but not limited to a rail vehicle, aircraft, marine vessel, robot, farm equipment, etc. Likewise, the electrified powertrain system 20 may be stationary, such as in the case of an electric powerplant, hoist, drive belt, or conveyor system. Therefore, the electrified powertrain system 20 in the representative vehicular embodiment of FIG. 1 is intended to be illustrative of the present teachings and not limiting thereof.

As appreciated by those skilled in the art, when using the propulsion battery pack 18 to power one or more single-phase or polyphase/alternating current devices such as a typical propulsion or traction motor, the propulsion battery pack 18 is connected to a power inverter (not shown), such that a voltage and current from the discharging battery cells 12 of the propulsion battery pack 18 is ultimately provided to the power inverter. A set of semiconductor switches residing within the power inverter are controlled via pulse width modulation, pulse density modulation, or other suitable switching control techniques to invert a DC input voltage into an AC output voltage suitable for energizing such motors. High-speed switching of the resident semiconductor switches of the power inverter thus ultimately cause the motor(s) to deliver a motor drive torque to one or more of the road wheels 24 in the illustrated vehicular embodiment of FIG. 1, or to another coupled mechanical load in other implementations.

Regardless of the end use or application of the battery cell 12, internal welds therewithin may be constructed using the illustrated integrated workstation 10. In possible implementations, the integrated workstation 10 may be used to perform a one-step welding process that integrates main welding and electrode foil trimming processes while eliminating a pre-welding process, or to perform a two-step welding process which integrates the pre-welding and electrode foil trimming processes followed by performance of the main welding process. Each option will be described in turn below.

As shown in FIG. 1, the cell body 14 encloses electrode foils 28 that protrude from an edge 240 of the cell body 14. The cell body 14 is arranged between respective upper and lower sections 26U and 26L of a clamping fixture 26, with the clamping fixture 26 configured for positioning the cell body 14 in a predetermined orientation. In this orientation, distal ends 280 of the electrode foils 28 extend outward from the clamping fixture 26. For instance, electromechanical, hydraulic, or pneumatic actuators (not shown) may apply a clamping force (arrows Fc) to the upper and lower sections 26U and 26L of the clamping fixture 26. The clamping fixture 26 thus gently and securely holds and retains the cell body 14 in the indicated orientation. In the representative orientation of FIG. 1, a longitudinal center axis 140 of the cell body 14 is arranged in a generally horizontal manner relative to a plant floor surface (not shown).

In the illustrated orientation of the cell body 14, the electrode foils 28 are presented toward a curvilinear guide clamp 30 constructed as set forth below with reference to FIGS. 2-4. The curvilinear guide clamp 30 in the exemplary construction of FIG. 2, for instance, includes opposing sections 30A and 30B configured to gently clamp the electrode foils 28 therebetween and also cause the electrode foils 28 to smoothly taper into an electrode foil stack 27. Also depicted in FIG. 1 is a trim tool 32, e.g., a laser beam or a hard cutter such as a sharpened blade operable for trimming the distal ends 280 of the electrode foils 28 during a trimming process. The integrated workstation 10 of FIG. 1 also includes a vibrating welding horn or sonotrode 34 and an anvil 36, with the anvil 36 connected to, formed integrally with, or placed adjacent to a trim block 36B. In the illustrated configuration, the anvil 36 is positioned opposite the sonotrode 34 on adjacent opposite surfaces of the electrode foil stack 27, and may be optionally heated via a heating source 38 as described below with reference to FIG. 4.

The sonotrode 34 of FIG. 1 as understood in the art is configured to vibrate at ultrasonic or higher frequencies and thereby weld the electrode foil stack 27 to a conductive lead tab 40 of the battery cell 12. In this manner the integrated workstation 10 is configured to form a welded joint within the battery cell 12, i.e., an internal weld. In a possible construction, the sonotrode 34 may have a multi-sided knurl pattern for heated crimping, ultrasonic pre-welding, and final welding. An exemplary approach for implementing a representative multi-sided variant of the sonotrode 34 is described below with particular reference to FIG. 5. Additionally, the conductive lead tab 40 may be secured between robotic fingers 42 of a robot (not shown) or within a suitable fixture and positioned adjacent to the oriented electrode foil stack 27. Portions of the conductive lead tab 40 may be encased or coated in a film 43, e.g., for handling and protection, with uncoated portions 41 used to form the above-noted welded joint via the method 100.

Figure 2:
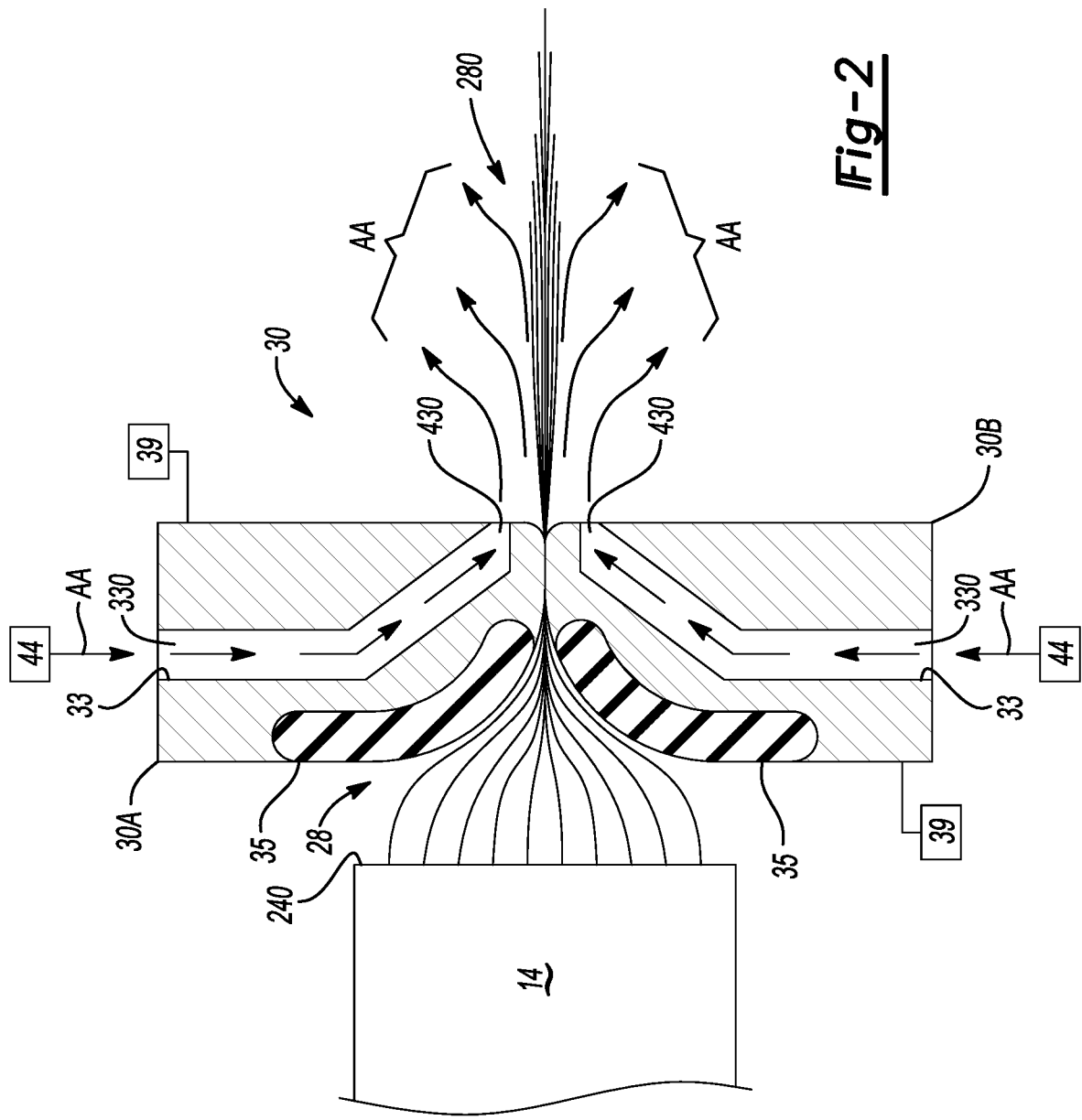
FIG. 2 is an illustration of a portion of the workstation of FIG. 1 illustrating a possible construction in which soft-touch guide clamps are used for guiding thin electrode foils of a battery cell toward a mating anvil and sonotrode, with the guide clamps possibly defining optional air channels for directing a pressurized airflow onto the electrode foils.

Referring now to FIG. 2, the opposing sections 30A and 30B of the curvilinear guide clamp 30 in one or more embodiments are moved together via a clamp actuator 39. The clamp actuator 39, which is shown schematically for illustrative simplicity, may be embodied as an electrical, electromechanical, hydraulic, or pneumatic device as appreciated in the art. A radiused surface 35 of the curvilinear guide clamp 30 gently contacts the electrode foils 28 protruding from the edge 240 of the cell body 14. The electrode foils 28 are very thin, e.g., about six microns to about fifteen microns (6-15μ), and thus are quite delicate and prone to damage during the manufacturing process. To protect the electrode foils 28, therefore, the radiused surface 35 of the curvilinear guide clamp 30 may be constructed from a soft, resilient polymer material such as an open-cell polymer or foam material. As used herein, "resilient" entails the capability of gently compressing against the electrode foils 28 and then returning to an uncompressed state when the electrode foils 28 are released. In other words, the materials of the radiused surface 35 would gently compress or yield as the clamp actuator 39 translates the opposing sections 30A and 30B into contact with the electrode foils 28, thereby protecting the electrode foils 28 from damage during this portion of the overall process.

Additionally, the curvilinear guide clamp 30 may optionally define respective air channels 33, e.g., one or more tubular openings passing through the opposing sections 32A and 32B as shown. In this embodiment, a blower 44 such as a motorized fan assembly is coupled to the air channels 33 and configured to direct a pressurized airflow (arrows AA) into a fluid inlet 330 of the air channels 33, through the air channels 33, and through a fluid outlet 430. The pressurized airflow (arrows AA) ultimately contacts the distal ends 280 of the electrode foils 28. Use of the pressurized airflow (arrows AA) in this manner is intended to help to maintain a desired alignment of the electrode foil stack 27. That is, the escaping airstream through the fluid outlets 430 gently blows onto and across the electrode foils 28 with sufficient air pressure to gently orient the electrode foils 28 and ensure top/bottom foils of the presented electrode foil stack 27 are unfolded and substantially flat or aligned.

Referring to FIGS. 3A and 3B, it is desirable during the performance of the method 100 of FIG. 1 to minimize tension on the electrode foils 28. In a possible embodiment, therefore, the method described herein may include clamping the electrode foils 28 in the curvilinear guide clamp 30 as described above (FIG. 3A), with the shape, contours, and materials of the curvilinear guide clamp 30 helping to reduce the probability of bent foil issues and other manufacturing issues as set forth above. Aspects of the method contemplated herein may further include translating the curvilinear guide clamp 30 by a predetermined distance (ΔX) toward the clamp fixture 26 or the cell body 14 as best shown in FIG. 3B, e.g., using a linear actuator 50 having a range of motion limited to the predetermined distance (ΔX). In this manner the linear actuator 50 applies a force (arrows FT) to the curvilinear guide clamp 30 sufficient for displacing the distal ends 280 and the electrode foils 28 by the predetermined distance (ΔX).

Representative implementations include a predetermined distance (ΔX) of less than or equal to about 1.0 millimeters (mm) and greater than or equal to about 0.10 mm in a possible implementation, or about 0.2 mm to about 0.5 mm, or about 0.3 mm to about 0.4 mm in different implementations. Such minute movements will tend to reduce tension on the fragile electrode foils 28, particularly in the middlemost layers of the electrode stack 27, thus minimizing the possibility of damage to the electrode foils 28 during the subsequent ultrasonic welding process.

Figure 4:
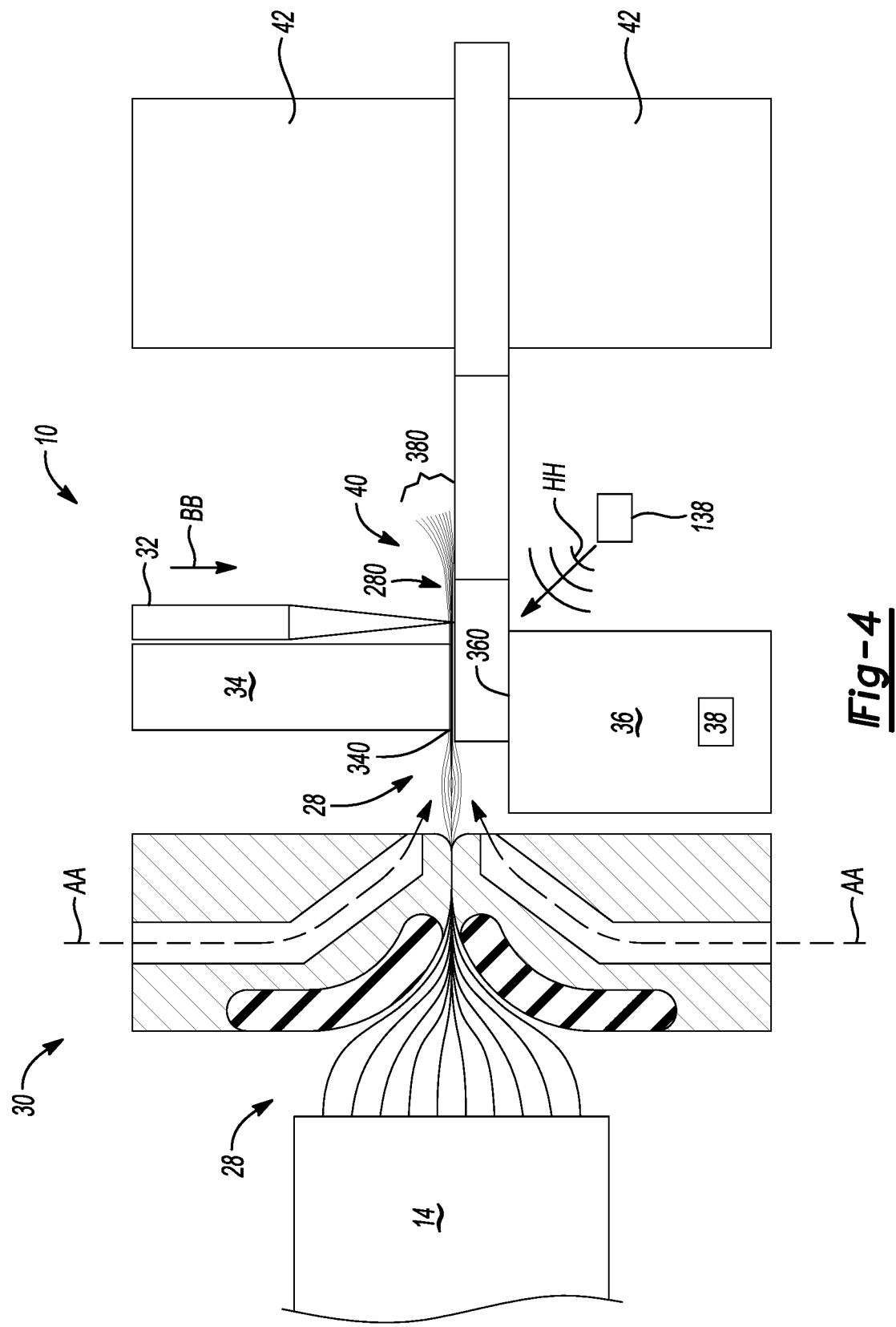
FIG. 4 is an illustration of the integrated process of FIG. 1.

Referring now to FIG. 4, in one or more embodiments of the integrated workstation 10, the trim tool 32 noted briefly hereinabove may be connected to the sonotrode 34 such that the trim tool 32 moves toward the anvil 36, or more specifically the trim block 36B of FIG. 1, in conjunction with movement of the sonotrode 34. Such movement is represented in FIG. 4 by arrow BB. While the trim tool 32 need not be connected to the sonotrode 34 in other configurations, it may be more efficient in terms of economy of motion to connect to the trim tool 32 to the sonotrode 34 when performing the present method during manufacturing of the battery cell 12 of FIG. 1. The trim tool 32 is thus used to perform a trimming process in which unused portions 380 of the electrode foils 28 are cleanly severed to form the distal ends 280. The unused portions 380 are then disposed of as scrap material.

Additionally, the integrated workstation 10 may include the optional heating source 38, e.g., a resistive heating element such as a conductive wire or coil, a fluidic heating source such as oil that is circulated through internal channels (not shown) in the anvil 36, or another suitable implementation allowing for internal heating of the anvil 36, and thus indirect heating of the metals forming the workpiece. The heating source 38, which may be operatively connected to or integral with the anvil 36 as shown schematically in FIG. 4, is thus operable for heating the anvil 36, particularly around working surfaces thereof. Heating the anvil 36 to about 175 degrees Celsius (° C.) to about 225° C., or to about 200° C., may help reduce the required force or energy for ultrasonic pre-welding of the electrode foils 28 together to form the electrode stack 27. That is, "pre-welding" as contemplated herein involves forming the electrode foils 28 into the electrode stack 27 before welding the electrode stack to the lead tab 40 ("final welding"). Use of applied heat in this manner in turn reduces the propensity for fracture of the electrode foils 28, particularly near the sonotrode 34.

Those skilled in the art will appreciate that the method described above may be performed without heating the anvil 36, e.g., by instead heating the conductive lead tab 40 and/or one or more of the electrode foils 28 using an external heating source 138. In such embodiments, the external heating source 138, e.g., a laser or a heat lamp operable for emitting heat energy (HH) toward the conductive lead tab 40 and/or the distal ends 280, may be situated in close proximity to the main tab 40 and the electrode foils 28 as shown. The external heating source 138 is usable alone or in conjunction with the heating source 38 of the anvil 36. As noted above, a working surface of the sonotrode 34 may have the knurled pattern 340 to enhance heated pre-welding and final welding, e.g., by helping to distribute heat to the affected surfaces of the electrode foils 28. The anvil 36 may have a similar knurled pattern 360 in some embodiments to achieve the same ends.

Figure 5:
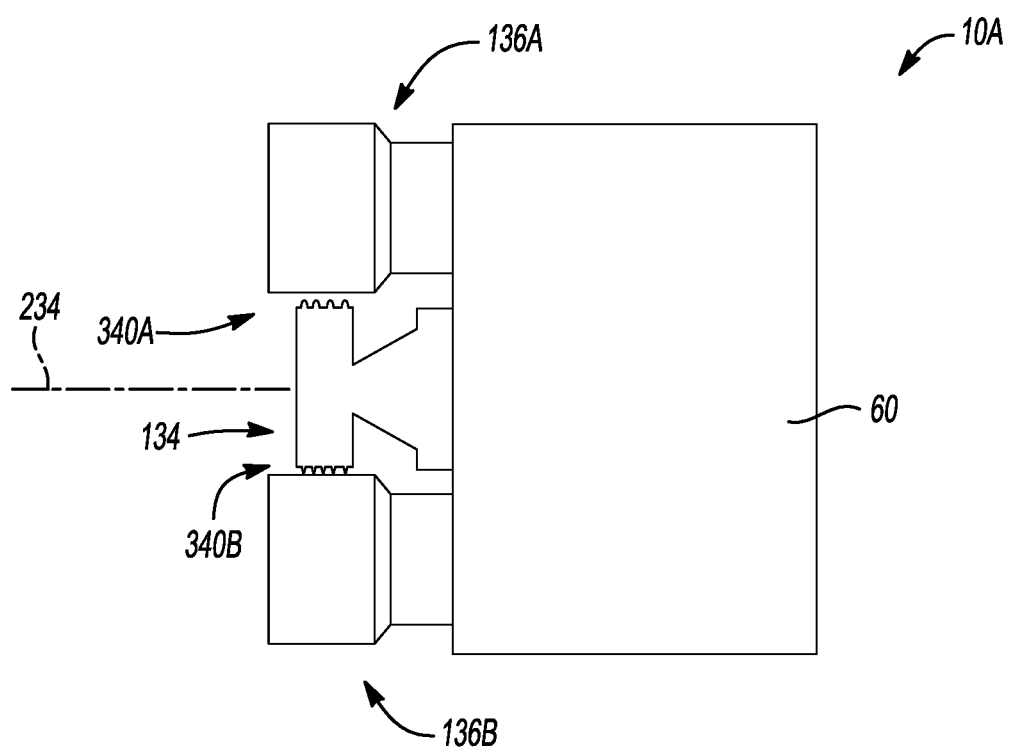
FIG. 5 is an illustration of an optional multi-sided sonotrode in accordance with an aspect of the disclosure.

Referring briefly to FIG. 5, it may be advantageous to use a multi-sided welding horn when forming the various ultrasonic welds, for instance during pre-welding and main welding. Such welds may require different knurl patterns. In the context of the present disclosure, running the two welding processes on the same welding machine would require rotation of the welding machine and use of a separate sonotrode 34 and anvil 36, or the use of a special welding machine having two different anvils 36 and a multi-sided sonotrode. The present integrated strategy may be achieved at a single integrated workstation in some embodiments using the latter solution.

In particular, an integrated workstation 10A is shown having a welding machine 60, a rotatable multi-sided sonotrode 134, and first and second anvils 136A and 136B. The sonotrode 134 has an axis of rotation 234 about which the welding machine 60 is operable for rotating the sonotrode 134 to present either: (1) the first anvil 136A and a first knurl pattern 340A, or (2) a second anvil 136B and a second knurl pattern 340B. The respective first and second knurl patterns 340A and 340B are configured for a given welding process, e.g., the second knurl pattern 340B may be used for pre-welding, and thus could be less pronounced, bumpy, or penetrating than the first knurl pattern 340A. Likewise, the first knurl pattern 340A may be configured to perform a main welding process, and thus may have larger, bumpier, or more penetrating knurls relative to the second knurl pattern 340B.

Thus, one side of the sonotrode 134 of FIG. 5 may be rotated into place and used for the pre-welding process, followed by rotation of the sonotrode 134 prior to performing the main welding process. The sonotrode 134 is then translated away from the stack before moving the trim tool 32 into place. Thus, positioning the sonotrode 134 and the anvil 136A or 136B adjacent opposite surfaces of the electrode foil stack 27 may include rotating the multi-sided sonotrode 134 to present a predetermined one of the different knurl patterns 340A or 340B adjacent to the electrode foil stack 27. Alternatively, a single-sided sonotrode 34 (see FIG. 1) may be used, which may require detachment and replacement of the sonotrode 34 and possibly the anvil 36 when transitioning between pre-welding and main welding processes. While two sides are shown in FIG. 5, those skilled in the art will appreciate that additional sides would be provided, e.g., for reduced wear.

Returning to FIG. 1, the integrated workstation 10 is thus suitable for use in performing a method for manufacturing the battery cell 12, which in turn has plurality of electrode foils 28 protruding from the cell body 14. An embodiment of such a method may include positioning the cell body 14 in the clamping fixture 26 such that distal ends 280 of the electrode foils 28 extend outward from the fixture 26, and then gently clamping or positioning the distal ends 280 of the electrode foils 28 between the opposing sections 30A and 30B of the curvilinear guide clamp 30. In this manner the curvilinear guide clamp 30 causes the distal ends 280 to smoothly curve or taper into the electrode foil stack 27. A possible implementation of the present teachings includes translating the curvilinear guide clamp 30 a predetermined distance (ΔX) toward the clamping fixture 26 to slightly displace the distal ends 280, and then trimming the unused portions 380 (FIG. 4) of the distal ends 280 using the above-described trim tool 32 in its various embodiments.

As part of the method 100, the sonotrode 34 and the anvil 36 are positioned adjacent opposite surfaces of the electrode foil stack 27. The disclosed methodology in this embodiment may include trimming the electrode foils 28 to form the distal ends 280 using the trim tool 32. This may occur either concurrently or sequentially with ultrasonically welding the electrode foil stack 27 to the conductive lead tab 40. Thus, the present method may include ultrasonically welding the electrode foil stack 27 to the conductive lead tab 40 using the sonotrode 34 to thereby form a welded joint within the battery cell 12, which may optionally occur at the same time as the above-described trimming process or sequentially therewith.

In constructions of the curvilinear guide clamp 30 in which the opposing sections 30A and 30B define the air channels 33, the method 100 could entail directing the pressurized airflow (arrows AA) through the respective air channels 33 and onto the distal end sections 280. Likewise, the method 100 may include heating the anvil 36 or the electrode foils 28 via the heating source 38 and/or 380 prior to and/or during ultrasonically welding the electrode foil stack 27.

The method described herein may be performed at a single workstation, e.g., the integrated workstation 10 of FIG. 1. Such a method may be characterized by an absence of pre-welding of the electrode foils 28 to each other prior to ultrasonically welding the electrode foil stack 27 to the conductive lead tab 40. In other words, main welding and trimming of the electrode foils 28 may occur in a one-step implementation. Alternatively, one may integrate pre-welding with trimming and perform main welding as a separate subsequent step. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for manufacturing a battery cell using a workstation, the battery cell having a plurality of electrode foils protruding from a cell body, the method comprising:
   positioning the cell body in a fixture of the workstation such that distal end sections of the electrode foils extend outward from the fixture;
   clamping the distal end sections of the electrode foils between resilient polymer surfaces of a curvilinear guide clamp of the workstation to cause the distal end sections of the electrode foils to taper into an electrode foil stack;
   translating the curvilinear guide clamp by a predetermined distance toward the fixture to displace the distal end sections of the electrode foils by the predetermined distance;
   trimming a portion of the distal end sections of the electrode foils by using a trim tool of the workstation;
   positioning a sonotrode and an anvil of the workstation adjacent to opposite surfaces of the electrode foil stack; and
   ultrasonically welding the electrode foil stack to a conductive lead tab of the battery cell using the sonotrode to form a welded joint within the battery cell.

2. The method of claim 1, wherein the translating the curvilinear guide clamp by the predetermined distance toward the fixture further comprises translating the curvilinear guide clamp by 0.1 millimeters (mm) to 1.0 millimeters (mm).

3. The method of claim 1, the method further comprising:
   directing pressurized airflow through respective air channels of opposing sections of the curvilinear guide clamp and onto the distal end sections of the electrode foil stack to maintain a planar alignment of the electrode foil stack.

4. The method of claim 1, further comprising:
   heating one or more of the electrode foil stack, the conductive lead tab or the anvil via a heating source of the workstation prior to or concurrently with the ultrasonically welding the electrode foil stack.

5. The method of claim 1, wherein the positioning the sonotrode and the anvil adjacent opposite surfaces of the electrode foil stack further comprises rotating a multi-sided sonotrode to present a predetermined one of a plurality of different knurl patterns of the multi-sided sonotrode adjacent to the electrode foil stack.

6. The method of claim 1, wherein the ultrasonically welding the electrode foil stack to the conductive lead tab occurs without pre-welding of the electrode foils.

7. The method of claim 1, wherein the trimming the portion of the distal end sections using the trim tool occurs concurrently or sequentially with the ultrasonically welding the electrode foil stack to the conductive lead tab.

8. The method of claim 1, wherein the trimming the portion of the distal end sections using the trim tool occurs concurrently with a movement of the sonotrode toward the anvil.

9. The method of claim 1, wherein the trimming the portion of the distal end sections using the trim tool of the workstation occurs concurrently with movement of the sonotrode of the workstation toward the anvil of the workstation.

10. A method for manufacturing a battery pack using a workstation, the battery pack having a plurality of battery cells, each respective one of the battery cells having electrode foils protruding from a cell pouch, the method comprising:
    positioning the cell pouch in a fixture of the workstation such that distal end sections of the electrode foils extend outward from the fixture;
    clamping the distal end sections of the electrode foils between resilient polymer surfaces of a curvilinear guide clamp of the workstation to cause the distal end sections of the electrode foils to taper into an electrode foil stack;
    directing a pressurized airflow through respective air channels of the curvilinear guide clamp and onto the distal end sections to maintain a planar alignment of the electrode foil stack;
    translating the curvilinear guide clamp toward the fixture to displace the distal end sections by a predetermined distance, wherein the predetermined distance is configured to reduce tension on the electrode foils;
    trimming a portion of the distal end sections of the electrode foils using a trim tool of the workstation;
    positioning a sonotrode and an anvil of the workstation adjacent opposite surfaces of the electrode foil stack, such that a double-sided knurl pattern of the sonotrode is adjacent the electrode foil stack;
    ultrasonically welding the electrode foil stack to a conductive lead tab of the battery cell by using the sonotrode to obtain a welded joint within the battery cell; and
    connecting the plurality of the battery cells together to form the battery pack.

11. The method of claim 10, further comprising:
    heating the conductive lead tab, the electrode foil stack, and the anvil via a heating source prior to ultrasonically welding the electrode foil stack.

12. The method of claim 10, wherein the positioning the sonotrode and the anvil adjacent to opposite surfaces of the electrode foil stack includes rotating a multi-sided sonotrode to present a knurl pattern of a multi-sided sonotrode adjacent to the electrode foil stack.

13. The method of claim 10, wherein the translating the curvilinear guide clamp toward the fixture to displace the distal end sections by the predetermined distance further comprises translating the curvilinear guide clamp by 0.1 to 1.0 millimeters (mm).

14. The method of claim 12, the method further comprising:
    using the trim tool to trim the electrode foil stack concurrently with ultrasonically welding the electrode foil stack to the conductive lead tab using the sonotrode.

15. A method for manufacturing a lithium ion battery cell using a workstation, the lithium ion battery cell having a plurality of electrode foils protruding from a pouch, the method comprising:
    providing the workstation, the workstation comprising a clamping fixture, a trim tool, a curvilinear guide clamp, a heating source, an anvil, and a sonotrode;
    positioning the pouch of the lithium ion battery cell in the clamping fixture of the workstation such that distal end sections of the electrode foils extend outward from the clamping fixture;
    clamping the distal end sections of the electrode foils between resilient polymer surfaces of the curvilinear guide clamp of the workstation to cause the distal end sections of the electrode foils to taper into an electrode foil stack of the lithium ion battery cell;
    translating the curvilinear guide clamp toward the fixture to displace the distal end sections of the electrode foils by 0.1 mm to 1 mm;
    trimming a portion of the distal end sections of the electrode foils by using the trim tool of the workstation;
    positioning the sonotrode of the workstation and the anvil of the workstation adjacent to opposite surfaces of the electrode foil stack of the lithium ion battery cell;
    heating the anvil via the heating source of the workstation; and
    ultrasonically welding the electrode foil stack to a conductive lead tab of the lithium ion battery cell using the sonotrode of the workstation to form a welded joint within the lithium ion battery cell.

16. The method of claim 15, wherein the clamping the distal end sections of the electrode foils further comprises applying a clamping force to upper and lower sections of the clamping fixture.

17. The method of claim 15, wherein the trimming the portion of the distal end sections by using the trim tool of the workstation further occurs using a laser beam.

18. The method of claim 15, wherein the trimming the portion of the distal end sections by using the trim tool of the workstation occurs using a blade.

19. The method of claim 15, further comprising:
    directing pressurized airflow through respective air channels of opposing sections of the curvilinear guide clamp and onto the distal end sections of the electrode foil stack to maintain a planar alignment of the electrode foil stack.

20. The method of claim 15, wherein the trimming the portion of the distal end sections using the trim tool of the workstation occurs concurrently with the ultrasonically welding the electrode foil stack to the conductive lead tab of the lithium ion battery cell.

* * * * *